United States Patent
Liu

(10) Patent No.: US 7,088,806 B2
(45) Date of Patent: Aug. 8, 2006

(54) APPARATUS AND METHOD TO IDENTIFY INTER-MTA CALLS

(75) Inventor: Angela S. Liu, San Francisco, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 591 days.

(21) Appl. No.: 10/460,956

(22) Filed: Jun. 13, 2003

(65) Prior Publication Data
US 2004/0252818 A1    Dec. 16, 2004

(51) Int. Cl.
*H04M 15/00*   (2006.01)
*H04Q 7/20*    (2006.01)
(52) U.S. Cl. ............... 379/126; 379/121.05; 455/432.2
(58) Field of Classification Search ................ 379/111, 379/114.01, 114.28, 121.05, 126; 455/403, 455/422.1, 432.1, 432.2
See application file for complete search history.

(56) References Cited

U.S. PATENT DOCUMENTS

| | | | | |
|---|---|---|---|---|
| 5,734,980 A | * | 3/1998 | Hooper et al. | 455/434 |
| 6,757,538 B1 | * | 6/2004 | Howe | 455/445 |
| 6,909,900 B1 | * | 6/2005 | Howe | 455/445 |
| 2005/0037750 A1 | * | 2/2005 | Goering et al. | 455/432.1 |
| 2005/0221863 A1 | * | 10/2005 | Howe | 455/564 |

* cited by examiner

*Primary Examiner*—Binh K. Tieu
(74) *Attorney, Agent, or Firm*—Gerald P. Joyce, III

(57) ABSTRACT

Methods and apparatus for determining whether a phone call is an inter-MTA or an intra-MTA call. Call detail records are retrieved that describe the call. An originating MTA is determined using the originating NPA/NXX, while the terminating MTA is determined using the terminating NPA/NXX. The determined originating MTA is compared with the determined terminating MTA to determine whether the phone call is an inter-MTA or an intra-MTA call.

26 Claims, 8 Drawing Sheets

APPARATUS AND METHOD TO IDENTIFY INTER-MTA CALLS

BACKGROUND OF THE INVENTION

In modern switched telecommunications systems (in particular, modern PSTNs) it has become common practice to provide two related but separate network infrastructures: a bearer or transmission network for carrying end-user voice and data traffic, and a signaling network for controlling the setup and release of bearer channels through the bearer network in accordance with control signals transferred through the signaling network. In practice, such signaling networks comprise high-speed computers interconnected by signaling links, wherein procedures control the computers to provide a set of operational and signaling functions in accordance with a standardized protocol. One example of such a signaling protocol is the Common Channel Signaling System No. 7 (i.e., SS7 or C7) which is being extensively deployed for control of telephone and other data transmission networks.

SS7 is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wireline call setup, routing and control. The ITU definition of SS7 allows for national variants such as the American National Standards Institute (ANSI) and Bell Communications Research (Telcordia Technologies) standards used in North America and the European Telecommunications Standards Institute (ETSI) standard used in Europe.

An SS7 network basically comprises various types of signaling points, namely, Signaling End Points (SEPs), for example an end office or local exchange, and Signaling Transfer Points (STPs) interconnected by signaling links, the SEPs being associated for example with respective Signaling Switching Points (SSPs) and Mobil Switching Centers (MSPs) of the transmission network, and with Service Control Points (SCPs).

The signaling information is passed over the signaling link in messages, which are called signal units (SUs). There are three types of SUs: message signal units (MSUs), link status signal units (LSSUs) and fill-in signal units (FISUs). The MSU is the workhorse in that signaling associated with call setup and tear down, database query and response, and SS& management is carried by Message Signal Units (MSUs). Know operations support systems (OSS systems), such as the AGILENT TECHNOLOGIES ACCESS7 system, extract data from the MSUs to generate Call detail Records (CDRs). The CDRs are analyzed by the OSS system to provide a variety of information about the SS7 network, for example: identification of signaling problems, location of network problems, service assurance data, and billing verification.

In fact, CDRs have proven extremely valuable for billing verification purposes. Analysis of CDRs can permit carriers to validate billing data to ensure that the charges they make are accurate and fair. For example, CDRs have been used to provide reports that distinguish the percentage of interstate traffic (billed at one rate) with intrastate traffic (billed at another rate). This percentage is known as the Percentage Interstate Usage (PIU). This has permitted local exchange carriers (LECS) to ensure that the charges to their associated inter-exchange carriers (IXCs) are accurate and visa-versa. Using the AGILENT TECHNOLOGIES ACCESS7 system, distinguishing between intrastate and interstate traffic is typically made using the Interconnect Analysis software. This software enriches the CDR information with information that assigns jurisdictional information to the CDR.

One area of development is billing solutions for calls that cross from wireless to wired communication system or visa-versa. As with any call, jurisdictional factors are used to determine the appropriate rates applied to such traffic. However, the geographical boundaries that LECs use to assign a jurisdiction is different from those used by WSPs. LECs use the Local Access and Transport Area (LATA) which divides the United States into 196 local geographical areas within which a LEC may offer service. For wireless traffic, the FCC has divided the country into geographic regions, termed Basic Trading Areas (BTAs), defined by a group of counties that surround a city, which is the area's basic trading center. The boundaries of each BTA are formulated by Rand McNally & Co. and are used by the FCC to determine service areas for PCS wireless license. BTAs are further grouped into Major Trading Areas (MTAs), once again formulated by Rand McNally & Co. These large areas are used by the FCC determine service areas for some PCS wireless licenses. The U.S. is divided into 51 MTAs. LECs and WSPs enter into agreement setting forth reciprocal payment schedules for calls that cross jurisdictions.

Under some interconnection agreements between LECs and WSPs, the WSP must make a compensation payment to the LEC at various rates for calls originating from a wireless device and terminating on a traditional landline device. The billing rates between the WSP and LEC are determined based on the originating MTA and terminating MTA. One rate exists for local traffic, defined as traffic originating and terminating within the same MTA, or IntraMTA. Another rate exists for non-local traffic, defined as traffic originating from one MTA and terminating within a second MTA, or InterMTA. With respect to LECs, known CDRs and methods of analysis associated therewith have proven adequate for verifying billing of land originated and terminated calls, but no solution exists for wireless originated and land terminated calls or vice-a-versa. The current practice for tracking such charges is for the WSP to provide a figure that represents a percentage of inter-MTA calls to the LEC. This number is used to determine the reciprocal compensation payments between the LEC and WSP. As the rate is based on MTA jurisdictions, many LECs are unable to verify the percentage of inter-MTA calls as reported by the WSP.

The present inventors have recognized a need for method and apparatus for reliably verifying the percentage of inter-MTA calls.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
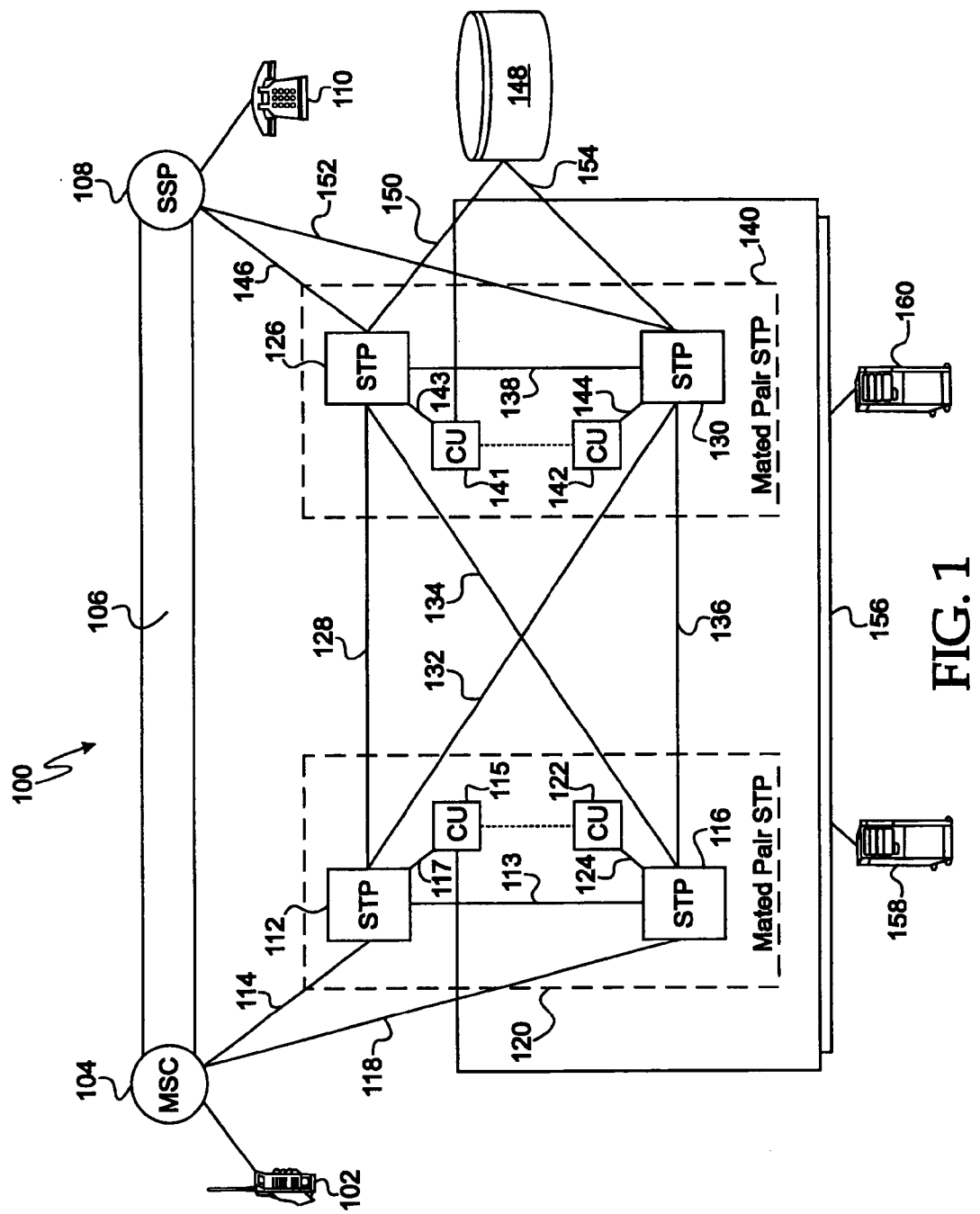
FIG. 1 is a block diagram of a signaling network.

Reference will now be made in detail to the present invention, examples of which are illustrated in the accompanying drawings, wherein like reference numerals refer to like elements throughout.

The detailed description that follows is presented in terms of general procedures and symbolic representations of operations of data within a computer memory, associated computer processors, networks, and network devices. These procedure descriptions and representations are the means used by those skilled in the data processing art to convey the substance of their work to others skilled in the art. The term "procedure" refers to a series of operations performed by a processor, be it a central processing unit of a computer, or a processing unit of a network device, and as such, encompasses such terms of art as: "software," "objects," "functions," "subroutines" and "programs."

The apparatus set forth in the present application may be specifically constructed for the required purposes or it may comprise a general-purpose computer or terminal selectively activated or reconfigured by a computer program stored in the computer. The procedures presented herein are not inherently related to any particular computer or other apparatus. In fact, a general purpose machines may be used implement many of the procedures described herein.

The present invention, as described, can be implemented using AGILENT's ACCESS7 OSS system and associated hardware. The ACCESS7 OSS system integrates with and monitors an SS7 network as described above. Those of ordinary skill in the art will recognize that there exist other platforms and languages for creating software for performing the procedures outlined herein. Those of ordinary skill in the art also recognize that the choice of the exact platform and language is often dictated by the specifics of the actual system constructed, such that what may work for one type of signaling system may not be efficient on another type of signaling system.

Figure 2:
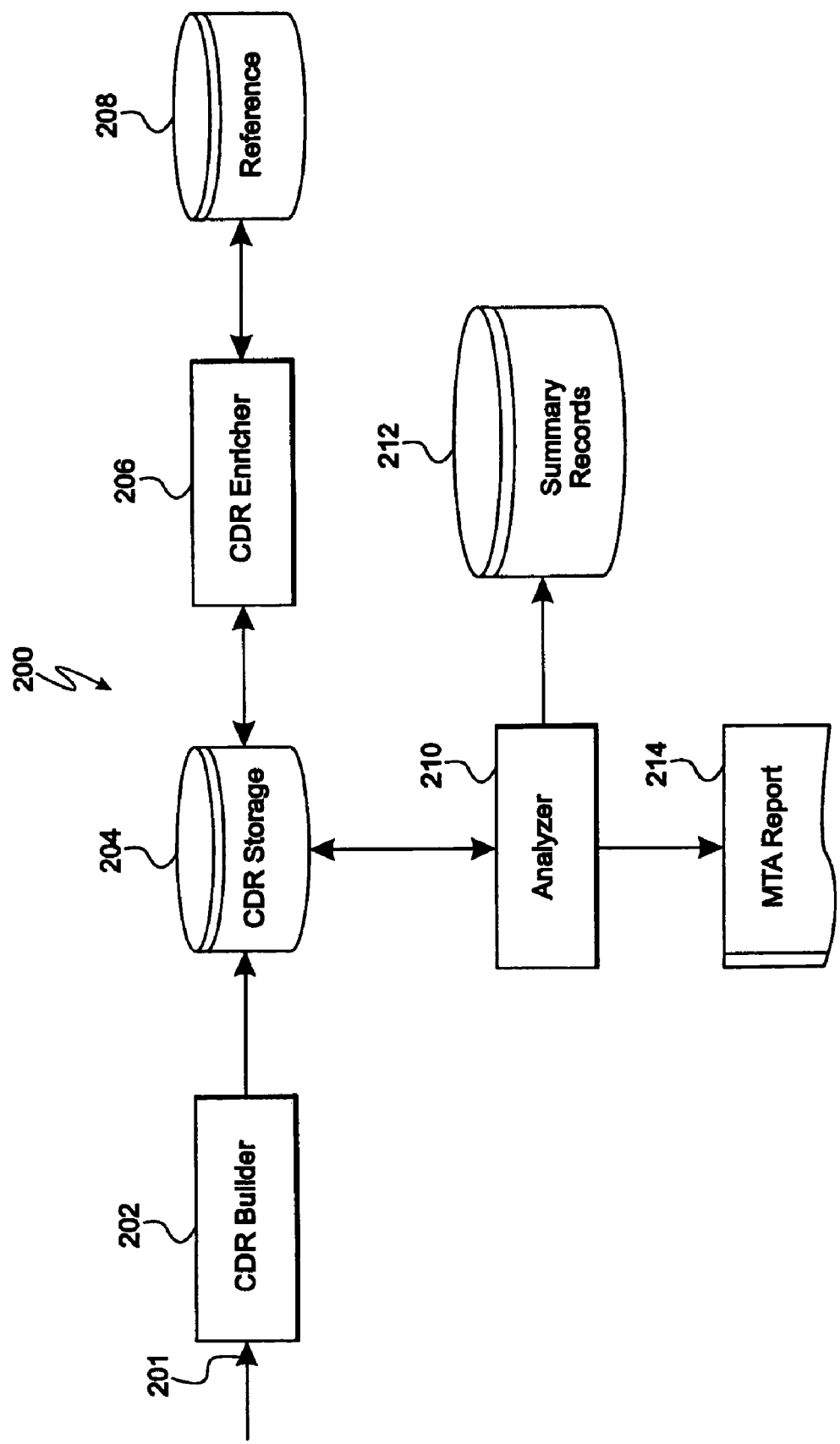
FIG. 2 is a block diagram of a CDR generation and analysis apparatus in accordance with a preferred embodiment of the present invention.
Figure 6:
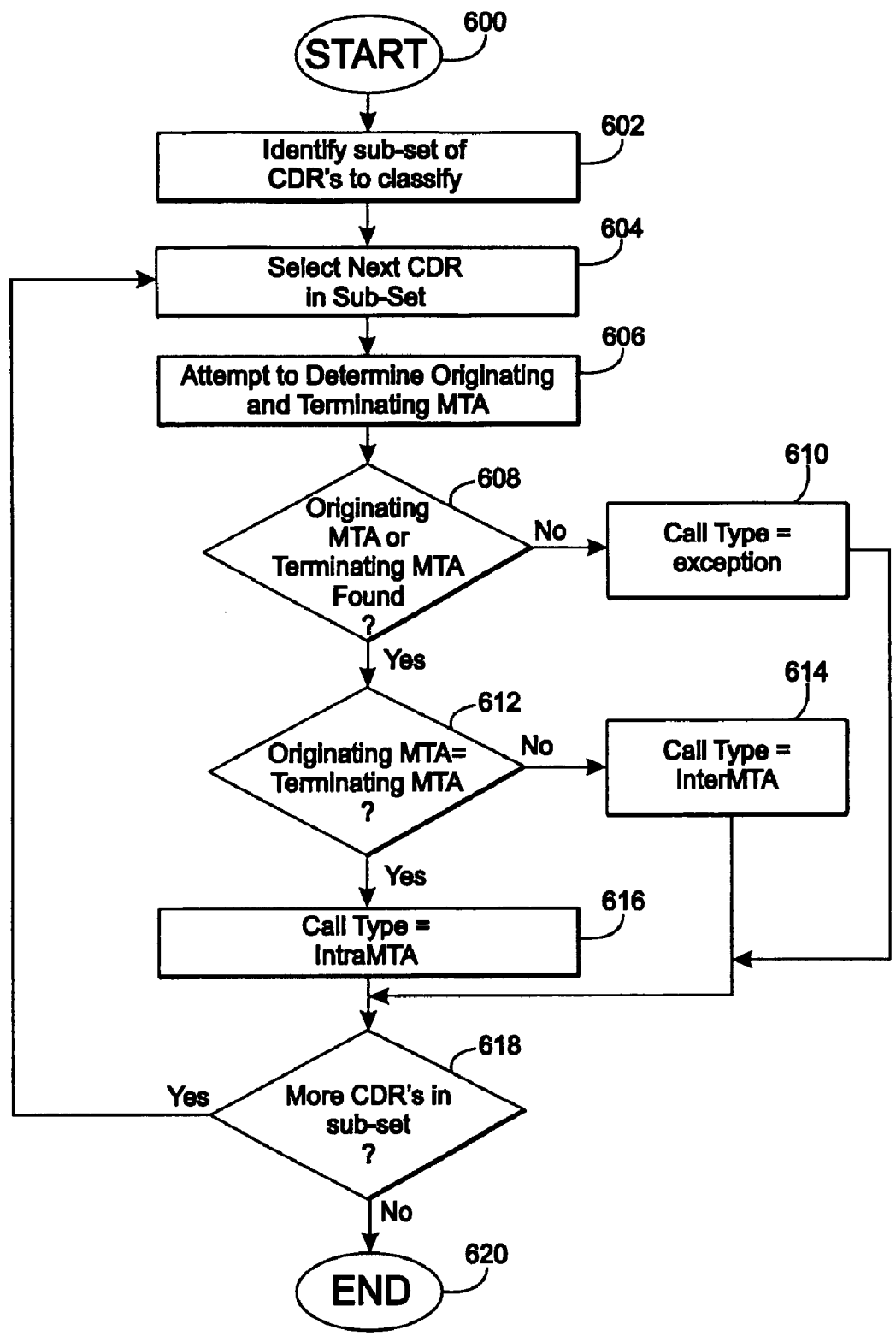
FIG. 6 is a flow chart of a method in accordance with a preferred embodiment of the present invention.
Figure 7:
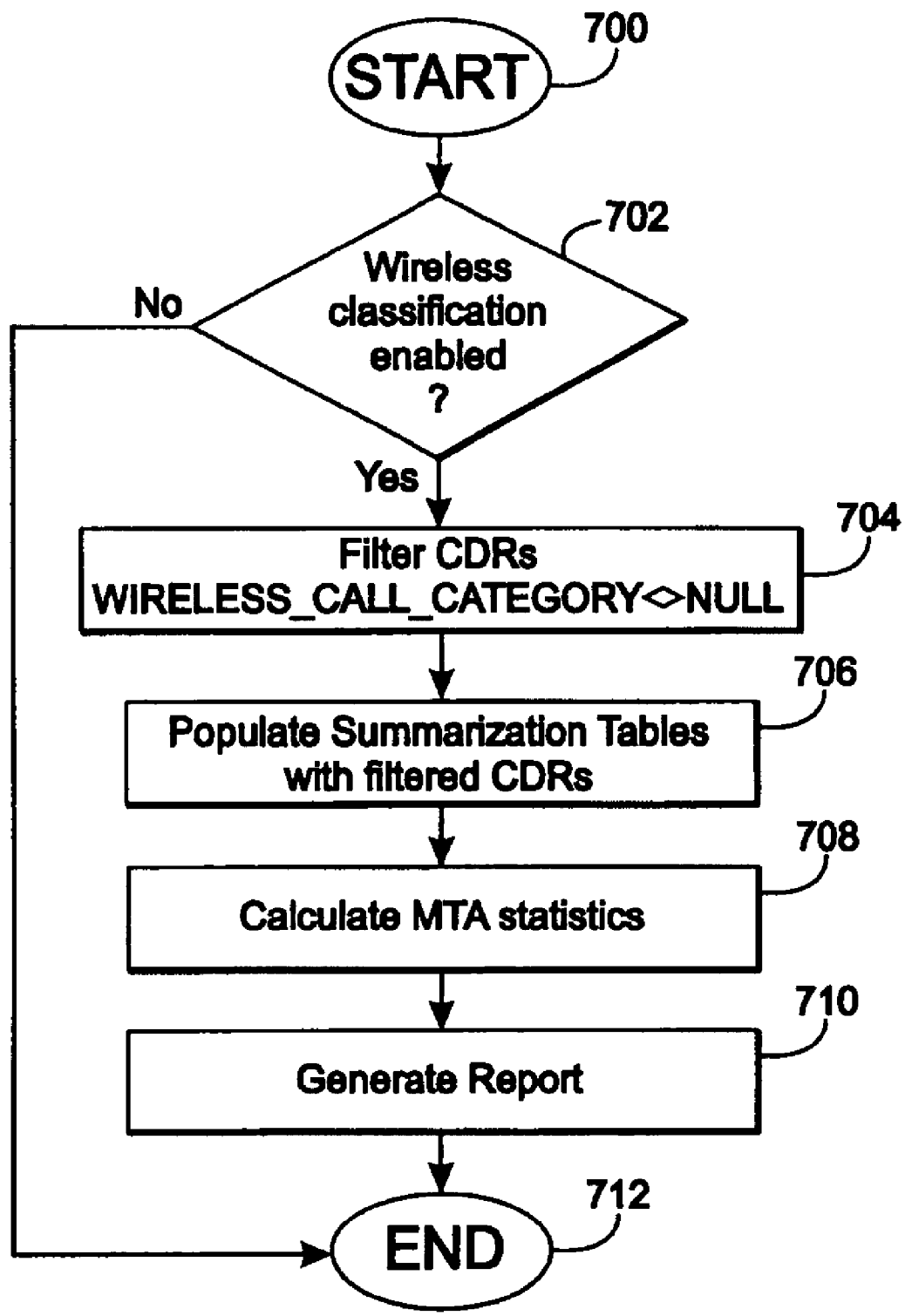
FIG. 7 is a flow chart of a method in accordance with a preferred embodiment of the present invention.

FIG. 1 is a block diagram of a signaling network 100. FIG. 2 is a block diagram of a CDR generation and analysis apparatus for use in the signaling network 100 in accordance with a preferred embodiment of the present invention. The structure illustrated in FIGS. 1 and 2 and the methods illustrated in FIGS. 6 and 7 emphasize certain features of the present invention while simplifying other features to aid in explanation. As such, the figures and associated discussion are to be regarded as illustrative and exemplary and not limiting as regards the invention described herein or the claims attached hereto. It will also be appreciated by those of ordinary skill in the relevant arts that the signaling network 100, as illustrated in FIGS. 1 and 2, and the methods of use thereof as described hereinafter with reference to FIGS. 6 and 7, are intended to be representative of such structures and methods. Further, any given system may differ significantly from that shown, particularly in the details of construction and operation of such system, as still fall within the spirit and scope of the invention.

The signaling network 100 supports an SS7 signaling protocol and comprises a wireless network terminating device such as PCS handset 102 coupled to a MSC 104. The MSC 104 is capable of establishing a connection 106 with a SSP 108 and vice versa, the SSP 108 being coupled to a network-terminating device such as a telephone handset 110. The details of such connection are outside the scope of the present invention and are omitted to avoid obscuring the present invention.

The MSC 104 is coupled to a first STP 112 by a first A link 114 and a second STP 116 by a second A link 118. The first STP 112 is coupled to the second STP 116 by a first C link 113 and, together, the first and second STPs 112, 116 constitute a first mated pair of STPs 120. A first Agilent® acceSS7 Network Monitoring System (NMS) comprises a first secondary collector unit 122 and a first primary collector unit 115. The first primary collector unit 115 is, although not essentially, co-located with the first STP 112 and coupled to first links (not shown) provided by the first STP 112 by a first number of electrical connections 117 corresponding to the first links. Similarly, although not essentially co-located, in this example the first secondary collector unit 122 is co-located with the second STP 116 and coupled to second links (not shown) provided by the second STP 116 by a second number of electrical connection 124 corresponding to the second links.

The first STP 112 is coupled to a third STP 126 by a first B link 128 and a fourth STP 130 by a second B link 132. The second STP 116 is also coupled to the third STP 126 by a third B link 134 and the fourth STP 130 by a fourth B link 136. The third STP 126 is coupled to the fourth STP 130 by a second C link 138 and, together, the third and fourth STPs 126, 130 constitute a second mated pair of STPs 140. The third STP 126 is coupled to the SSP 108 by a third A link 146 and an SCP 148 by a fourth A link 150. The fourth STP 130 is also coupled to the SSP 108 and the SCP 148, but by a fifth A link 152 and a sixth A link 154, respectively.

A second Agilent® acceSS7 NMS comprises a second primary collector unit 141 and a second secondary collector unit 142. For the purposes of the present invention, the structure of the second primary collector 141 may be considered (although not always) identical to the structure of the first primary collector 115 and the structure of the second secondary collector 142 may be considered (although not always) identical to the structure of the first secondary collector 122. The second primary collector unit 141, although not essentially, is co-located with the third STP 126 and coupled to third links (not shown) provided by the third STP 126 by a third number of electrical connection 143 corresponding to the third links. Similarly, although not essentially co-located, in this example the second secondary collector unit 142 is co-located with the fourth STP 130 and coupled to fourth links (not shown) provided by the fourth STP 130 by a fourth number of electrical connection 144 corresponding to the fourth links.

The first and second primary collectors 115 and 141 are coupled to a wide area network (WAN) 156 through which connections to any number and variety of computing devices can be made. In the example shown in FIG. 1, two servers, 158 and 160, are shown. The collectors 115, 122, 141, and 142 collect data regarding messaging traffic on the SS7 network and create CDRs. Analysis of the CDRs can be performed by any number of capable units, for example the collectors 115, 122, 141, and 142 along with any computing device connected to the WAN 156, such as the servers 158 and 160.

FIG. 2 is a block diagram of a CDR generation and analysis apparatus 200 in accordance with a preferred embodiment of the present invention. The CDR generation and analysis apparatus is sometimes referred to as a data management center (DMC). DMC are also known by a variety of names, which varies by vendor, such as a data management center, data management system, management site, etc . . . While shown as a single logical entity, the CDR generation and analysis apparatus may be physically distributed, or centralized, to any available processor connected to the network. It may prove useful to distribute the functions of the CDR generation and analysis apparatus 200 among the first and second primary collectors 115 and 141 and at least one server, such as servers 158 and 160, connected to the WAN 156.

The CDR generation and analysis apparatus 200 comprises a Call Detail Record (CDR) builder entity 202 with a data input 201. The CDR builder entity 200 is able to generate CDRs and store the generated CDRs in a CDR storage 204. In this example, the CDR builder entity 200 is embodied in software and the CDR storage 204 is a data file stored on a hard disc drive. The CDR builder entity 200 and the CDR storage 204 are known parts of the Agilent® acceSS7 LMS and so will not be described further. Table 1 is an example of a CDR specification used by the business intelligence application associated with AGILENT's ACCESS7 OSS.

TABLE 1

| Field Name | Description |
| --- | --- |
| CDR_DATE | The date that the CDR was loaded into the repository. |
| CDR_ID | A sequence numbers for the CDR. This can be used to link this table row to a row in another table. This is useful for enriching a CDR with rating information, etc. |
| DMC_ID | Each Data Management Center (DMC) in the world has an identifier that is encrypted in the product activation license. Tagging a CDR with this identifier allows the originating DMC to be determined in situations where data is handed off between DMC systems. |
| PARTITION_ID | Each Oracle partition has an identifier. This field is used primarily to bin CDRs into the correct partition and has little user value. |
| STUDY_ID | A sequence number for a specific acceSS7 filter configuration over a specified period of time. Tagging a CDR with this identifier allows the determination of the exact acceSS7 configuration (filters, links...) that caused this CDR to be collected. |
| CLASS_ID | The acceSS7 class ID that is associated with this CDR. |
| SITE_ID | Specifies the acceSS7 site number that collected this CDR. |
| TIMEZONE | Specifies the time zone upon which all times in the CDR are based. |
| INCOMPLETE_FLG | A flag that specifies that acceSS7, was not able to completely populate the CDR. |
| CALL_IN_PROGRESS_FLG | A flag that specifies a call that is still in progress. |
| CALL_TIMEOUT_FLG | A flag that specifies that an acceSS7 timeout occurred before all parts of a call were collected. |
| REPEATING_CALL_IN_PROGRESS_FLG | |
| FORCED_DELIVERY_FLG | |
| OPC_1 | The 1st component of the originating point code. |
| OPC_2 | The 2nd component of the originating point code. |
| OPC_3 | The 3rd component of the originating point code. |
| DPC_1 | The 1st component of the destination point code. |
| DPC_2 | The 2nd component of the destination point code. |
| DPC_3 | The 3rd component of the destination point code. |
| CALLING_NUMPLAN | |
| CALLING_NPA | The NPA component of the calling number. |
| CALLING_NXX | The NXX component of the calling number. |
| CALLING_LINE | The LINE component of the calling number. |
| CALLING_INT_NUM | The entire calling number if the number is thought to be international. |
| CALLING_PARTY_CAT_CD | |
| CALLED_NPA | The NPA component of the called number. |
| CALLED_NXX | The NXX component of the called number. |
| CALLED_LINE | The LINE component of the called number. |
| CALLED_INT_NUM | The entire called number if the number is thought to be international. |
| CHARGE_NPA | The NPA component of the charge number. |
| CHARGE_NXX | The NXX component of the charge number. |
| CHARGE_LINE | The LINE component of the charge number. |
| CHARGE_INT_NUM | The entire charge number if the number is thought to be international. |
| CALLED_NUMPLAN | |
| IAM_DATE_TIME | The initial address message date/timestamp (nearest second). |
| IAM_MILLISEC | The initial address message timestamp (milliseconds component). |

TABLE 1-continued

| Field Name | Description |
| --- | --- |
| ANM_DATE_TIME | The answer message date/timestamp (nearest second). |
| ANM_MILLISEC | The answer message timestamp (milliseconds component). |
| REL_DATE_TIME | The release message date/timestamp (nearest second). |
| REL_MILLISEC | The release message timestamp (milliseconds component). |
| EXM_DATE_TIME | The exit message date/timestamp (nearest second). |
| EXM_MILLISEC | The exit message timestamp (milliseconds component). |
| ACM_DATE_TIME | The address completes message date/timestamp (nearest second). |
| ACM_MILLISEC | The address completes message timestamp (milliseconds component). |
| RLC_DATE_TIME | The release-clear message date/timestamp (nearest second). |
| RLC_MILLISEC | The release-clear message timestamp (milliseconds component). |
| IAM_REL_DUR | Time duration between IAM and REL messages (seconds). |
| IAM_REL_CCS | Time duration between IAM and REL messages (CCS). |
| ANM_REL_DUR | Time duration between ANM and REL messages (seconds). |
| ANM_REL_CCS | Time duration between ANM and REL messages (CCS) |
| CALLING_NATR_ADDR_CD | Acronym describing the context of the calling number derived from the calling nature of address indicator. |
| CALLING_NATR_ADDR_IND | Raw calling nature of address indicator. |
| CALLING_EVEN_ODD_FLG | Even/odd number of address signals for calling number. |
| CALLED_NATR_ADDR_CD | Acronym describing the context of the called number derived from the called nature of address indicator. |
| CALLED_NATR_ADDR_IND | Raw called nature of address indicator. |
| CALLED_EVEN_ODD_FLG | Even/odd number of address signals for called number. |
| CHARGE_NATR_ADDR_CD | Acronym describing the context of the charge number derived from the charge nature of address indicator. |
| CHARGE_NATR_ADDR_IND | Raw charge nature of address indicator. |
| CHARGE_EVEN_ODD_FLG | Even/odd number of address signals for charge number. |
| ORIG_LINE_CD | Represents toll class of service for the call. |
| CARRIER_ID_CD | Identifies the carrier selected by the caller. |
| CARRIER_SELECT_CD | Identifies how the caller selected a carrier. |
| TCIC | Trunk circuit identification code. |
| JURISDICTION | Numerical data indicating the geographic origination of the call. |
| BACKWD_CHARGE_CD | Backward charge indicator for called party. |
| BACKWD_CALLED_STAT_CD | Backward called party's status indicator. |
| BACKWD_CALLED_CAT_CD | Backward called party's category indicator. |
| BACKWD_END_TO_END_CD | Backward end-to-end method indicator. |
| BACKWD_INTERWORK_FLG | Backward interworking indicator. |
| BACKWD_IAM_SEG_FLG | Backward IAM segmentation indicator. |
| BACKWD_ISUP_FLG | Backward ISDN user part indicator. |
| BACKWD_HOLDING_FLG | Backward holding indicator. |
| BACKWD_ISDN_ACCESS_FLG | Backward ISDN access indicator. |
| BACKWD_ECHO_CNTL_FLG | Backward echo control device indicator. |
| BACKWD_SCCP_CD | Backward SCCP method indicator. |
| RELEASE_CAUSE_CD | Indicates the reason for releasing a specific connection. Note CDRs are generated for failed calls as well as successful calls. |
| RELEASE_LOC_CD | Indicates where the release was initiated. |
| TRANSIT_NETWORK_CD | Indicates the long distance carrier or transit network to be used to carry this call. This is used whenever the call is an inter-LATA call or international call. |
| ORIG_CALLED_NUMPLAN | |
| ORIG_CALLED_NPA | Used when call redirecting (forwarding) occurs. Identifies the NPA component of the number of the party that initiated the redirection. |
| ORIG_CALLED_NXX | Used when call redirecting (forwarding) occurs. Identifies the NXX component of the number of the party that initiated the redirection. |
| ORIG_CALLED_LINE | Used when call redirecting (forwarding) occurs. Identifies the LINE component of the number of the party that initiated the redirection. |

TABLE 1-continued

| Field Name | Description |
| --- | --- |
| ORIG_CALLED_INT_NUM | Used when call redirecting (forwarding) occurs. Identifies the entire number of the party that initiated the redirection if this number is thought to be international. |
| ORIG_CALLED_NATR_ADDR_IND | Raw original called number nature of address indicator. |
| REDIRECT_NPA | Used when call redirecting (forwarding) occurs. Identifies the NPA component of the number to which the called number is to be redirected. |
| REDIRECT_NXX | Used when call redirecting (forwarding) occurs. Identifies the NXX component of the number to which the called number is to be redirected. |
| REDIRECT_LINE | Used when call redirecting (forwarding) occurs. Identifies the LINE component of the number to which the called number is to be redirected. |
| REDIRECT_INT_NUM | Used when call redirecting (forwarding) occurs. Identifies the number to which the called number is to be redirected if this number is thought to be international. |
| REDIRECT_NATR_ADDR_IND | Raw redirecting number nature of address indicator. |
| ORIG_REDIRECT_REASON_CD | Indicates the reason the original redirection occurred. |
| REDIRECT_REASON_CD | Indicates the reason for subsequent redirection. |
| REDIRECT_COUNT | Indicates the number of redirections that have occurred. |
| FORWD_IN_INT_CALL_FLG | Forward incoming international call indicator. |
| FORWD_END_TO_END_CD | Forward end-to-end method indicator. |
| FORWD_INTERWORK_FLG | Forward interworking indicator. |
| FORWD_IAM_SEG_ | FLG Forward IAM segmentation indicator. |
| FORWD_ISUP_FLG | Forward ISDN user part indicator. |
| FORWD_ISUP_PREF_CD | Forward ISDN user part preference indicator. |
| FORWD_ISDN_ACCESS_ | FLG Forward ISDN access indicator. |
| FORWD_SCCP_CD | Forward SCCP method indicator. |
| FORWD_PORTED_NUM_FLG | Forward ported number translation indicator. |
| LRN_NPA | Used with Local Number Portability (LNP). Indicates the NPA component of the local routing number. |
| LRN_NXX | Used with Local Number Portability (LNP). Indicates the NXX component of the local routing number. |
| LRN_LINE | Used with Local Number Portability (LNP). Indicates the LINE component of the local routing number. |
| LRN_INT_NUM | Used with Local Number Portability (LNP). Identifies the local routing number if this number is thought to be international. |
| GAP_NPA | Indicates the NPA component of the Generic Address Parameter (GAP) number. When LNP is provided, the GAP provides the actual dialed digits for a ported number. |
| GAP_NXX | Indicates the NXX component of the Generic Address Parameter (GAP) number. When LNP is provided, the GAP provides the actual dialed digits for a ported number. |
| GAP_LINE | Indicates the LINE component of the Generic Address Parameter (GAP) number. When LNP is provided, the GAP provides the actual dialed digits for a ported number. |
| GAP_INT_NUM | Indicates the Generic Address Parameter (GAP) number if the number is thought to be international. When LNP is provided, the GAP provides the actual dialed digits for a ported number. |
| GAP_TYPE_OF_ADDR_IND | Indicates the type of address contained in the Generic Address Parameter (GAP). |
| GAP_NATR_OF_ADDR_IND | Raw Generic Address Parameter (GAP) nature of address indicator. |
| OUT_TRUNK_GROUP_NUM | Outgoing trunk group number. |
| SERVICE_CODE_CD | Service code assigned by the North American Numbering Plan Administration. Can be used to identify a specific type of service. |
| CIP_SEQ_NUM | This is a number assigned sequentially from 0 for each CDR pertaining to the same leg of the same call. For example, if RCIP/CIP CDRs are configured, the first CIP CDR has a sequence number of 0, the first RCIP CDR has a sequence number of 1, the second RCIP CDR has a sequence number of 2 and so on. With CIP CDRs, but no RCIP CDRs, the CIP CDR has a sequence number of 0 and the final CDR a sequence number of 1. With no CIP CDRs at all, the final CDR has a sequence number of 0. |

TABLE 1-continued

| Field Name | Description |
| --- | --- |
| CIP_CORRELATION_ID | This is an identifier which is the same for all CIP CDRs which apply to the same leg of the same call (and different from all other CIP CDRs) |
| CIP_START_TIME | The start time of the period covered by this call in progress CDR (accurate to 1 second) |
| CIP_START_MILLISEC | The milliseconds portion of the CIP_START_TIME |
| CIP_END_TIME | The end time of the period covered by this call in progress CDR (accurate to 1 second) |
| CIP_END_MILLISEC | The milliseconds portion of the CIP_END_TIME |
| CORRELATION_ID | Sequences number for a correlated set of CDRs. Given a CDR that is a member of a correlated set, this can be used to find the other members of the correlated set. |
| CORRELATION_DUPLICATE_FLG | This flag indicates that this CDR is thought to be identical to another CDR within the set of CDRs to be correlated. |
| CORRELATABLE_FLG | This flag indicates that this CDR is thought to be complete enough to be included in the correlation processing. |
| ENRICHED_CALLING_NPA | Contains the CALLING_NPA to be used in the correlation process. Local number portability, number completion, etc can influence the contents of this column. |
| ENRICHED_CALLING_NXX | Contains the CALLING_NXX to be used in the correlation process. Local number portability, number completion, etc can influence the contents of this column. |
| ENRICHED_CALLING_LINE | Contains the CALLING_LINE to be used in the correlation process. Local number portability, number completion, etc can influence the contents of this column. |
| ENRICHED_CALLING_INT_NUM | Contains the calling digits to be used in the correlation process in the event they are thought to be an international number. Local number portability, number completion, etc can influence the contents of this column. |
| ENRICHED_CALLED_NPA | Contains the CALLED_NPA to be used in the correlation process. Local number portability, number completion, etc can influence the contents of this column. |
| ENRICHED_CALLED_NXX | Contains the CALLED_NPX to be used in the correlation process. Local number portability, number completion, etc can influence the contents of this column. |
| ENRICHED_CALLED_LINE | Contains the CALLED_LINE to be used in the correlation process. Local number portability, number completion, etc can influence the contents of this column. |
| ENRICHED_CALLED_INT_NUM | Contains the called digits to be used in the correlation process in the event they are thought to be an international number. Local number portability, number completion, etc can influence the contents of this column. |
| CORRELATION_CONFIDENCE | This parameter indicates the degree of confidence associated with the correlation of this CDR with other CDRs. This is a bit-wise parameter where each bit has a specific meaning. |
| CROSS_CORRELATION_ID | |

The term call detail record (CDR) refers to any electronic record of the details of a call including, for example, originating number (NPA/NXX), terminating number (NPA/NXX), time, duration, etc . . . What constitutes a CDR varies by vendor and customer. Even within a single OSS family, different applications, such as billing, fraud detection, and business intelligence may direct the formation of CDRs with varying content. Further, there are several efforts at formulating standards from CDR content, such as ANSI standard TIA/EIA-124 Revision D for CDR content for wireless applications. The applicability of the present invention will remain regardless of the nomenclature, content and format of the electronic record that may vary from vendor to vendor and system to system.

In accordance with an embodiment of the present invention, the first CDR generation and analysis apparatus 200 is adapted by the provision of a CDR enricher 206. The CDR enricher 206 accesses data from and stores enriched data to the CDR storage 204. The CDR enricher enriches the CDRs stored in the CDR data store 204 with indications of the originating MTA and terminating MTA based on data stored in a reference database 208. The reference database 208 comprises a table that references Numbering Plan Area and exchange information (often abbreviated as NPA/NXX) to their respective MTA. Such data is available from commercial sources, such as AMERICAN ROAMER. In most cases, it will be useful to strip the required fields or mask non-needed fields from a much larger database. Table 2 is a description of fields than may be added by the CDR enricher 206 to permit subsequent evaluation of whether a call is inter or intra MTA.

The columns 302, 304, and 306 are overlaid with ovals 314 and 316 representing MTAs 1 and 2, respectively. MTA 1 comprises four MSCs 318a through 318d. MSC 318b serves as a gateway to MTA 2. MTA 2 comprises three MSCs 320a through 320c with MSC 320 serving as the gateway to MTA 1. MTA 1 geographically covers portions of States A (including portions of LATA 1 and LTA2), B and C, while MTA 2 covers other portions of states A and B, also including sections in LATA 1 and LATA 2.

TABLE 2

| Column Name | Type | Description |
| --- | --- | --- |
| ia_wireless_call_category | VARCHAR2(8) | Indicates wireless category of the CDR. If WirelessClassificationEnabled is TRUE, this field is set to 'WIRELINE' or 'WIRELESS' based on LERG reference table lookup. If MtaEnrichmentEnabled is TRUE, this field is set to: INTERMTA/INTRAMTA: for inter/intra MTA calls. NOGCMTA/NOCDMTA: for call where one of the calling/called MTA is missing. OTHERS |
| ia_orig_mta | VARCHAR2(4) | Originating MTA of the call. Taken from MTA reference database. |
| Ia_term_mta | VARCHAR2(4) | Terminating of the call. Taken from MTA reference database. |

An analyzer 210 retrieves CDRs from the CDR storage 204 for analysis. Results of analysis carried out by the analyzer 210 may be (but don't have to be): stored in a file on the storage unit 212, for example a hard disc drive or solid state storage device. The analyzer 210 may comprise a set of procedures that mine the CDR storage 204 and generate reports that, for example: summarize, identify problems, bill, and/or present a statistical analysis of the CDRs stored in the CDR storage 204 or a sub-set thereof. Most of the procedures performed by the analyzer 210 are outside the scope of the present invention and further comment thereon will be dispensed with. For the purposes of the present invention, the analyzer 210 is provided with procedures that mine the CDR storage 204 for CDRs enriched by the CDR enricher 206 and prepares a report indicating a percent of inter-MTA traffic.

Figure 3:
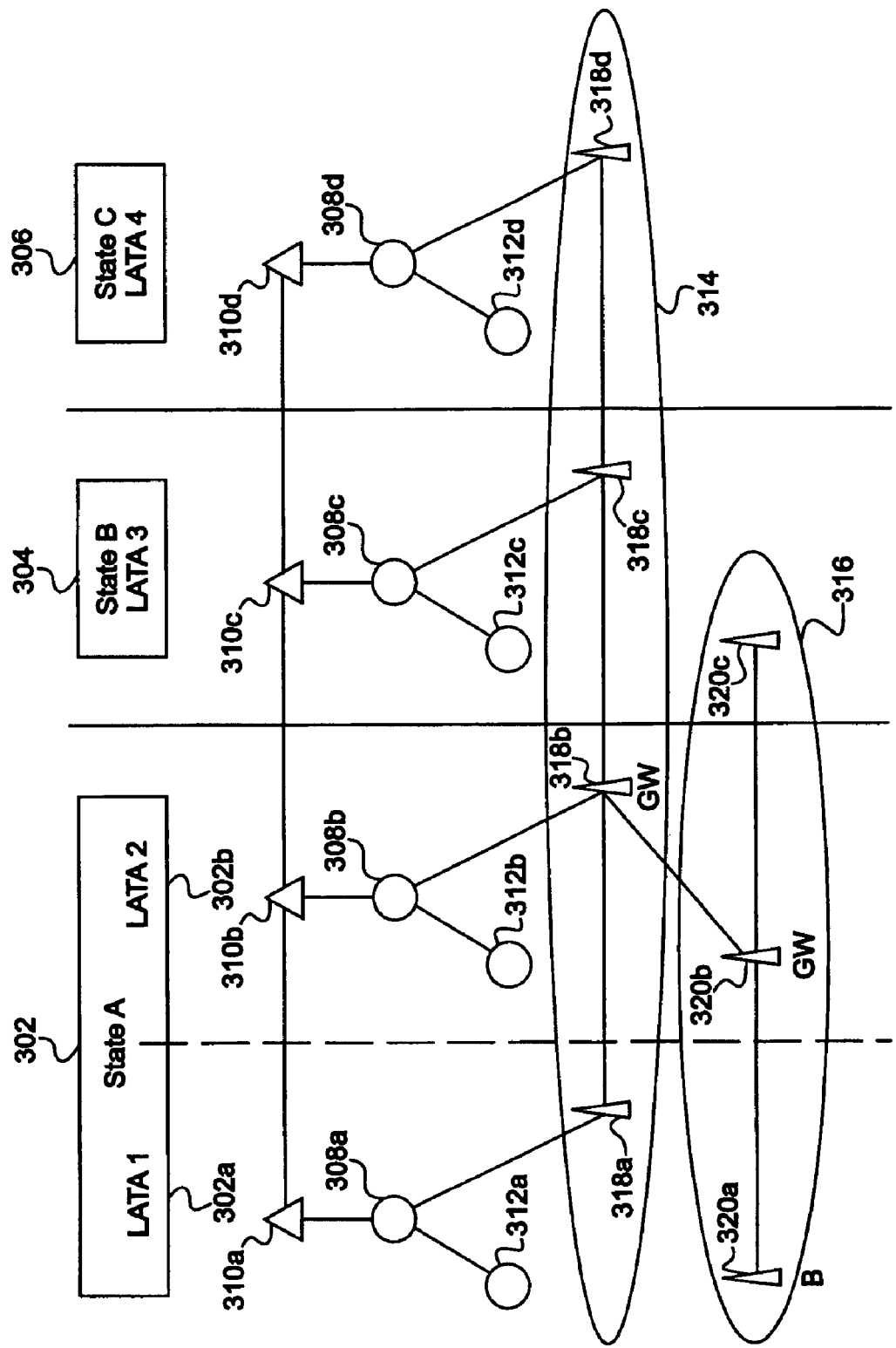
FIG. 3 is a conceptual diagram useful for explaining the present invention.

At this point it may be useful to review the events that take place when a call is placed from wireless phone to a wire line phone. FIG. 3 is a conceptual diagram useful for explaining the present invention. The three columns 302, 304, and 306 in the diagram represents portions of three states: A; B; and C respectively. While the represented portions of states B and C are assigned to a single LATA each (3 and 4 respectively), state A is further subdivided into two columns 302a and 302b representative of two different LATAs 1 and 2. LATA 1, represented by column 302a is served by local exchange carrier (LEC) 308a. Similarly, LATAs 2 through 4 are each served by respective LECs 308b through 308d. The LATAs 308n are interconnected by interexchange carriers (IXC) 310n. While FIG. 1 shows each LATA connected to an IXC 310, it is to be noted that any one IXC 310 may in fact serve several LECs. Each LEC 308n connects a plurality of end offices 312n (e.g. an SEP), one of which is shown for each LEC 308n. An end office 312n is a central office to which a telephone subscriber is connected and from which the subscriber receives a dial tone.

Figure 4:
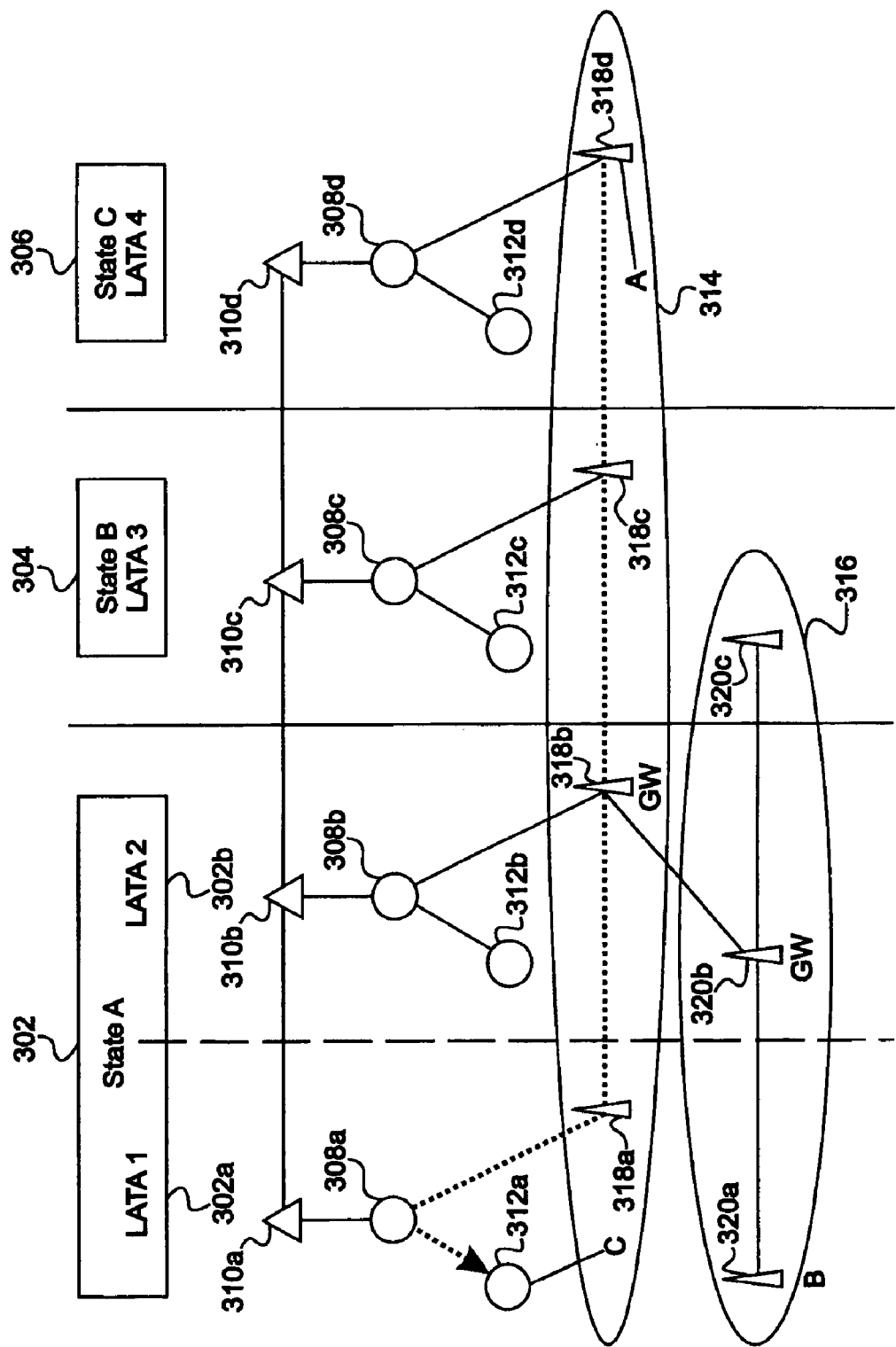
FIG. 4 is a conceptual diagram useful for explaining the present invention.

FIG. 4 is a conceptual diagram useful for explaining the present invention. In the example shown in FIG. 4 a wireless user A is making an intra-MTA call to wired user C. In this case, user A initially connects with the MSC 318d that in turn passes the call to MSC 318a (through MSCs 318c and 318b). The MCS 318a passes the call through the LEC 308a that in turn routes the call to user Cs end office 312a. In an enriched CDR formed in accordance with the present invention, the originating and terminating MTA would be the same.

Figure 5:
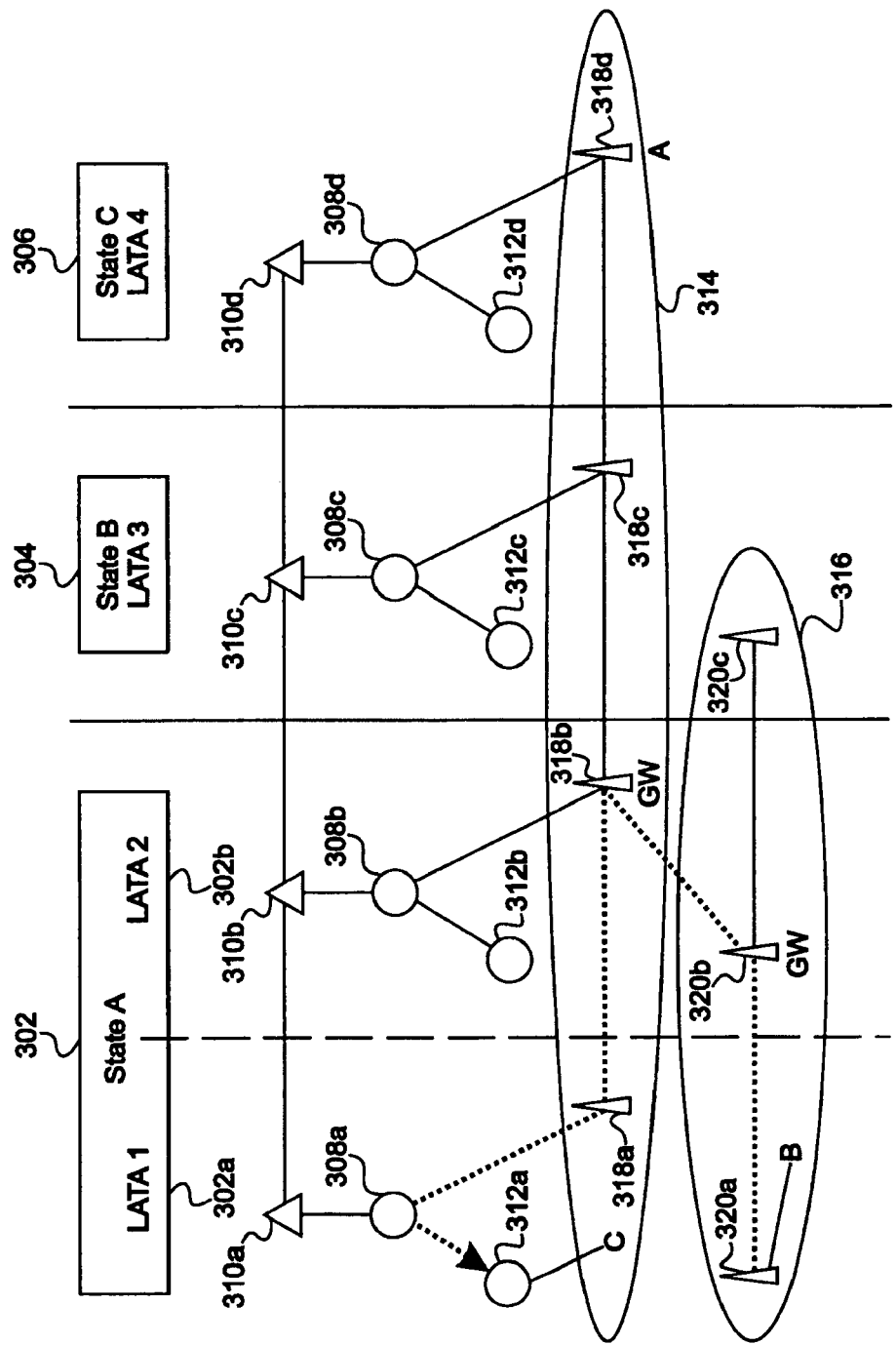
FIG. 5 is a conceptual diagram useful for explaining the present invention.

FIG. 5 is a conceptual diagram useful for explaining the present invention. In the example shown in FIG. 5 a wireless user B is making an intra-MTA call, from MTA 2 to MTA 1, to the wired user C. In this case, user B initially connects with the MSC 320a that in turn passes the call to MSC 320b. The MCS 320b acts as a gateway to route the call to the gateway, MCS 318b, for MTA 2. MCS 318b routes the call to MCS 320a that passes the call to the LEC 308a. The LEC 308a routes the call to user Cs end office 312a. In an enriched CDR formed in accordance with the present invention, the originating and terminating MTA would be different.

With the call process in mind, methods for implementing the present invention will be discussed. FIG. 6 is a flow chart of a method in accordance with a preferred embodiment of the present invention. FIG. 6 is a representation of a procedure that may be used by the CDR enrichment unit 206, in FIG. 2, to enrich CDR data with MTA related fields. The procedure starts in step 600.

Thereafter, in step 602, a sub-set of CDRs are identified to be classified as inter or intra MTA. For the purposes of this example, the sub-set is limited to calls originating from a wireless telephone. Those of ordinary skill in the art will recognize that sub-sets of CDRs can be formulated using any desired basis, for example, a wide variety of masks can be used to restrict the data to, for example, particular WSPs, LECs, dates and times.

The following is a sub-procedure, presented in pseudo-code, suitable for performing the identifications referenced in step 602:

```
                        SUB-PROCEDURE 1

ClassifyWirelessCDRs( CorrleatedCDRs CorrCdrs)
    {
If (
        WirelessClassificationEnabled
    AND
    (
                ( carrier_code OR (SuperCarrierCode OR SuperSuperCarrierCode if
        UseSuperCarrier is ENABLED) of any of the CorrelatedCDRs matches the
        Config.WirelessClassifiedCarriers )
        OR
                (Config.WirelessClassifiedCarriers is NULL )
            )
            AND
            (
                (carrier_type of any of the CorrelatedCDRs matches the
        Config.WirelessClassifiedCarrierTypes )
                OR
                (Config.WirelessClassifiedCarrierTypes is NULL )
            )
        )
    then
    {
        calling_num = NULL
        if ( UseJIP == 'TRUE )
                calling_num = findJIParamInCorrelatedSet(CorrlCDRs);
        if (calling_num is NULL )
                calling_num =findCallingNumberInCorrelatedSet(CorrlCDRs);
        if ( lregRefData.find(calling_num) )
        isWireless = 'Y';
        else
                isWireless = 'N';
        for ( cdr in CorrlCDRs )
        {
                cdr.isWireless= isWireless;
        }
    }
```

SUB-PROCEDURE 1 uses several parameters to control operation:
1. WirelessClassificationEnabled(=TRUE|FALSE): If WirelessClassificationEnabled is set to TRUE, the wireless classification is enabled. If WirelessClassificationEnabled is set to FALSE or" " (NULL), the wireless classification is disabled.
2. WirelessCarriers (=<comma separated list of carrier names>): WirelessCarriers should be set to a comma-separated list of carriers. A CDR/CCR is considered for wireline/wireless classification if it originates from any of these carriers or it is correlated to a CDR, which originated from any one of these carriers.
3. WirelessCarrierTypeCode (=<comma separated list of Carrier Types>): WirelessCarrierTypeCode should be set to a list carrier types. A CDR/CCR is considered for wireline/wireless classification if it originates from any of these type of carriers or it is correlated to a CDR, which originated from any one of these type of carriers.
4. UseSupercarrier(=TRUE|FALSE): If UseSuperCarrier is set to TRUE and WirelessCarriers is not NULL, then all the sub carriers of the carriers listed in Wireless-Carriers are appended to the value of WirelessCarriers.
5. UseJIP(=TRUE|FALSE): If UseJIP is set to TRUE, JIP field is used, instead of calling number for wireless classification.

In the example used herein, a Boolean variable Wireless-ClassificationEnabled is used to control operation. If WirelessClassificationEnabled is set to TRUE, then wireless classification is enabled. If WirelessClassificationEnabled is set to FALSE or " " (NULL), the wireless classification is disabled. If WirelessCarrierTypeCode and WirelessCarriers is set to NULL, then all the CDRs are considered for wireless classification. If one of the WirelessCarrierTypeCode or WirelessCarriers is not set to a non-NULL value, the non-NULL parameter is used for wireless classification. If both the WirelessCarrierTypeCode and WirelessCarriers are set to non-NULL value, then only the CDRs originating at the one of the WirelessCarriers, or CDRs originating from one of the WirelessCarrierTypeCode, are considered for wireless classification.

In the above procedure, a determination is made as to whether a call originates from a wireless phone. In the method implemented by SUB-PROCEDURE 1, the originating NPA/NXX, as stored in CALLING_NPA and CALLING_NXX, is cross-referenced with the Local Exchange Routing Guide (the LERG) to identify call originating from wireless exchanges. While the example uses the publicly available LERG, other data from other sources may be utilized for this lookup.

For calls originating from a wireless phone, the values used to populate CALLING_NPA and CALLING_NXX usually obtained from the NPA/NXX portion of the originating phones mobile identification number (MIN). The MIN is a static value and is reported that same regardless of the actual location of the cell phone when originating the call. It is becoming more and more popular to bill calls using the actual starting and ending points rather than using the home location of the cell phone. It is also to be noted that WSPs sometimes fail to populate the CALLING_NPA and CALLING_NXX fields. AS a backup, the originating NPA/NXX may also be obtained from CALLED_NPA and CALLED_NXX. These fields are also typically populated by the MIN of the originating cell phone, with the problems inherent thereto.

The originating NAP/NXX of a wireless phone may also be obtained from the jurisdictional identification parameter (the JIP). While not yet finalized, the JIP in the SS7 should be populated for wireless call with a geographic locator, such as the real originating NPA/NXX. If the current proposals are adopted, WSPs will populate the JIP with an NPA/NXX of the local exchange from which a call is being made, regardless of the NPA/NXX contained in the MIN. Unfortunately, at the present time, compliance by WSPs is limited. This is expected to improve in the future. SUB-PROCEDURE 1 permits the use of the JIP value if so desired.

In step 604, a loop is started with steps 606 through 618 being selectively repeated for each CDR in the sub-set identified in step 602. In step 606, for each CDR an attempt is made to determine the originating and terminating MTAs. As set forth above, the originating and terminating MTAs may be determined by comparing the originating and terminating NPA/NXX values in the CDRs with commercially available data, from such sources as AMERICAN ROAMER. The CDR is enriched by adding fields indicative of the originating and terminating MTA. TABLE 3 is an example of a portion of a database that can be used as the reference database 208 (see FIG. 2). The database in TABLE 3 has been populated with data from a commercial source.

TABLE 3

| NPA | NXX | From | To | Carrier | MTA# | MTA |
|---|---|---|---|---|---|---|
| 870 | 636 | 0000 | 9999 | SunCom | 28 | Memphis |
| 870 | 637 | | | | 40 | Little Rock |
| 870 | 638 | 0000 | 9999 | Sprint PCS | 40 | Little Rock |
| 870 | 638 | 0000 | 9999 | Sprint PCS | 40 | Little Rock |
| 870 | 639 | | | | 40 | Little Rock |
| 870 | 642 | | | | 7 | Dallas |
| 870 | 644 | | | | 40 | Little Rock |
| 870 | 645 | | | | 7 | Dallas |
| 870 | 647 | | | | 40 | Little Rock |
| 870 | 648 | | | | 40 | Little Rock |
| 870 | 652 | | | | 40 | Little Rock |
| 870 | 653 | | | | 7 | Dallas |
| 870 | 654 | 0000 | 9999 | Alltel | 40 | Little Rock |
| 870 | 655 | | | | 28 | Memphis |
| 870 | 656 | | | | 40 | Little Rock |
| 870 | 657 | | | | 28 | Memphis |
| 870 | 658 | | | | 28 | Memphis |
| 870 | 659 | 0000 | 9999 | SunCom | 40 | Little Rock |
| 870 | 663 | | | | 40 | Little Rock |
| 870 | 664 | 0000 | 9999 | SunCom | 40 | Little Rock |
| 870 | 665 | 0000 | 9999 | Sprint PCS | 40 | Little Rock |

If the originating NPA/NXX is obtained from the MIN, the identification of the originating MTA is subject to errors introduced by roaming. The MIN is a permanent number assigned to a cell phone and does not change with location. This will introduce a certain amount of error in calculation performed in accordance with the present invention. At the present time, this error is unavoidable when using a NPA/NXX obtained from the MIN. However, the delta introduced by this inaccuracy can be estimated and somewhat normalized. In the future as more and more WSPs populate the JIP, it will be possible to eliminate much of this error as the JIP value will change with the actual jurisdiction.

Next in step 608, a determination is made whether both the originating MTA and terminating MTA were identified in step 608. In general, each WSP has the contractual obligation to fill various data fields, however in practice, the signaling data provided by some WSPs fall short of compliance. The NPA/NXX field is usually populated and it is estimated that a small percentage of CDRs will lack a value in this field for the origination and termination number. As noted above, the situation is quite different for the JIP, with limited compliance at the present time.

If an MTA match was not identified for at least one of the originating and terminating NPA/NXX the call type is identified as an exception in step 610. If both the originating and terminating MTAs were identified, the originating MTA is compared to the terminating MTA is step 612. If the two are not equal, the call type is identified as an Inter-MTA call in step 614, otherwise the call is identified as an Intra-MTA call in step 616. In each of step 610, 614 and 616 the selected CDRs are enriched with additional fields indicating the call type, e.g. Inter-MTA, Intra-MTA, or some indication of the cause of the exception. Additional fields may be populated with some example presented herein below. In step 618, a check is made as to whether more CDRs remain in the sub-set. If so, the procedure returns to step 604 and the next CDR is selected for processing. Once all CDRs have been processed the procedure ends in step 622.

The following is a sub-procedure, presented in pseudo-code, suitable for performing the operations referenced in the loop comprising steps 604 through 618:

```
SUB-PROCEDURE 2 setMTA(CorrelatedCDRs CorrlCDRs)
{
    if ( CorrlCDRs[0].isWireless == FALSE || licenseEnabled ==
        FALSE )
            return;
    callingNumber = 'NULL'
    if ( jipEnabled )
        callingNumber = getJIP(CorrlCDRs);
    if ( callingNumber == 'NULL' )
        callingNumber = getCallingNumber(CorrlCDRs);
    calledNumber = getCalledNumber(CorrlCDRs);
    callingMTA = mtaRefDataLookup(callingNumber);
    calledMTA = mtaRefData.lookup(calledNumber);
    if ( callingMTA != NULL & calledMTA != NULL )
        if ( callingMTA = calledMTA )
            callType = 'InterMTA'
        else
            callType = 'IntraMTA'
    else
        if ( callingMTA != NULL && calledMTA == NULL )
            callType = 'NOCGMTA'
        if ( callingMTA == NULL && calledMTA != NULL )
            callType = 'NOCDMTA'
        else
            callType = 'Others'
    for ( cdr in CorrlCDRs )
    {
        cdr.WirelessCategory = callType;
        cdr.callingMTA = callingMTA;
        cdr.calledMTA = calledMTA;
    }
}
```

If WirelessClassificationEnabled is TRUE, MTA codes will be added to CDRs in the identified sub-set. Where WirelessClassificationEnabled=TRUE and no carriers or carrier types are provided then all traffic will be classified for MTA. While not specifically discussed, it is possible to mix combinations of MTA classification with wireless/wireline origination classification. In this example, three fields are added to the subject CDR: WirelessCategory, callingMTA and calledMTA. WirelessCategory contains an indication of whether the call was an inter or intra MTA, while callingMTA and calledMTA contain indications of the originating and terminating MTAs respectively. It may prove beneficial to add a flag indicative of whether the calling MTA was determined using a JIP value or a Min value. Such an indication can be used to determine an error range.

FIG. 7 is a flow chart of a method in accordance with a preferred embodiment of the present invention. FIG. 7 is a representation of a procedure that may be used by the analyzer 210, in FIG. 2, to produce a report that summarizes the percent inter-MTA and intra-MTA for each desired WPS and/or groups of WSPs. As is known to those of ordinary skill in the art, it may be useful to execute the method illustrated in FIG. 7 as part of a broader procedure that prepares a batch of reports at a scheduled time.

The procedure starts in step 700. In step 702, a determination is made as to whether wireless classification is enabled, using the variable WirelessClassificationEnabled. If WirelessClassificationEnabled=TRUE, the procedure goes to step 704 and records with the appropriate enhancements are filtered, for example where a wireless call category has been added, or the originating and/or terminating MTA have been added. Those of ordinary skill in the art will recognize that a variety of additional filters may be implemented instead of or in addition to the described filters. For example the CDRs could additional be filtered using WSP.

In step 706 wireless summarization tables are populated using the filtered CDRs. Table 4, is an example of a Wireless CDR Summarization Table generated in step 706.

TABLE 4

| COLUMN NAME | DESCRIPTION |
| --- | --- |
| summary_id | This is the Study_ID assigned to the calls. This enables different users of the application to generate reports from the summary tables specific to their studies. |
| study_id | The Carrier Code for the interconnected carrier. |
| Carrier_code | The name of the carrier, as derived from the network code of the interconnecting switch. |
| Carrier | The type of the interconnect carrier, such as CLEC or WSP. |
| Carrier_type | Trunk Group Serial Number |
| TGSN | Traffic Usage. Used to determine Feature Group (FG) of a trunk. |
| traffic_use | State that Calling NPA-NXX is in. |
| Calling_state | State that Called NPA-NXX is in. |
| Called_state | LATA that Calling NPA-NXX is in. |
| Calling_LATA | State that Called NPA-NXX is in. |
| Called_LATA | The OPC of the call. |
| Calling_switch | The DPC of the call. |
| Called_switch | O/T (Originating/Terminating) |
| direction | Category of call. |
| call_category | Transit Flag. Is call a transit call? |
| Transit_flg | Indicates whether call was toll free |
| Isp_call_flg | Indicates whether MF Interworking is used on a previous leg of the call |
| Isp_number | Indicated whether MF Interworking is used on an onward leg of the call |
| Isp_name | Indicates the service provider for the call (From the optional service provider id funcionality) |
| Nocpn_delivered_flg | Indicates the service provider for the call (From the optional service provider id funcionality) |
| Calling_number_patched_flg | T/F. Is call to a known ISP? |
| Called_number_patched_flg | The number of the ISP. |
| Calling_number_derived_flg | The name of the ISP. |
| Called_number_derived_flg | T/F. Was Calling Party Number present in original CDR? |
| Forwd_interwork_flg | T/F. Calling number was missing but was patched from an earlier CDR. |
| backwd_interwork_flg | T/F. Called number was missing but was patched from an earlier CDR. |
| toll_free_flg | T/F. Calling number was missing but was derived by using the default NPA-NXX for the Originating switch. |
| Calling_account_ownership | T/F. Called number was missing but was derived by using the default NPA-NXX for the Terminating switch. |
| Called_account_ownership | ID to distinguish which instance of summarisation produced this summary data. |
| Time | The date of the termination of the call. |
| No_calls | Number of calls. |
| No_answered_calls | Number of answered calls. |
| anm_rel_dur | Total duration (minutes of use) of terminating calls. |
| iam_rel_dur | Total duration (minutes of use) of originating calls. |
| IA_WIRELESS_CALL_CATEGORY | Indicates wireless category of CDR. |
| IA_ORIG_MTA | Originating MTA of the call. Taken from MTA reference database. |
| IA_TERM_MTA | Terminating of the call. Taken from MTA reference database. |

This example is predicated upon the use of TABLE 4 for reports other than those described herein. The following fields are directly related to the calculation of % Inter MTA in accordance with the present invention: IA_WIRELESS_CALL_CATEGORY; IA_ORIG_MTA; and IA_TERM_MTA. These fields are carryovers from the enriched CDR fields described in Table 1.

In step 708, desired statistics are calculated. While any number of statistics may be calculated the following are offered by way of example: the total number of calls; total minutes of calls; number of calls for which originating and terminating MTAs were available; number and length of Inter-MTA calls and percentage thereof; and number and length of Intra-MTA calls and percentage thereof.

Figure 8:
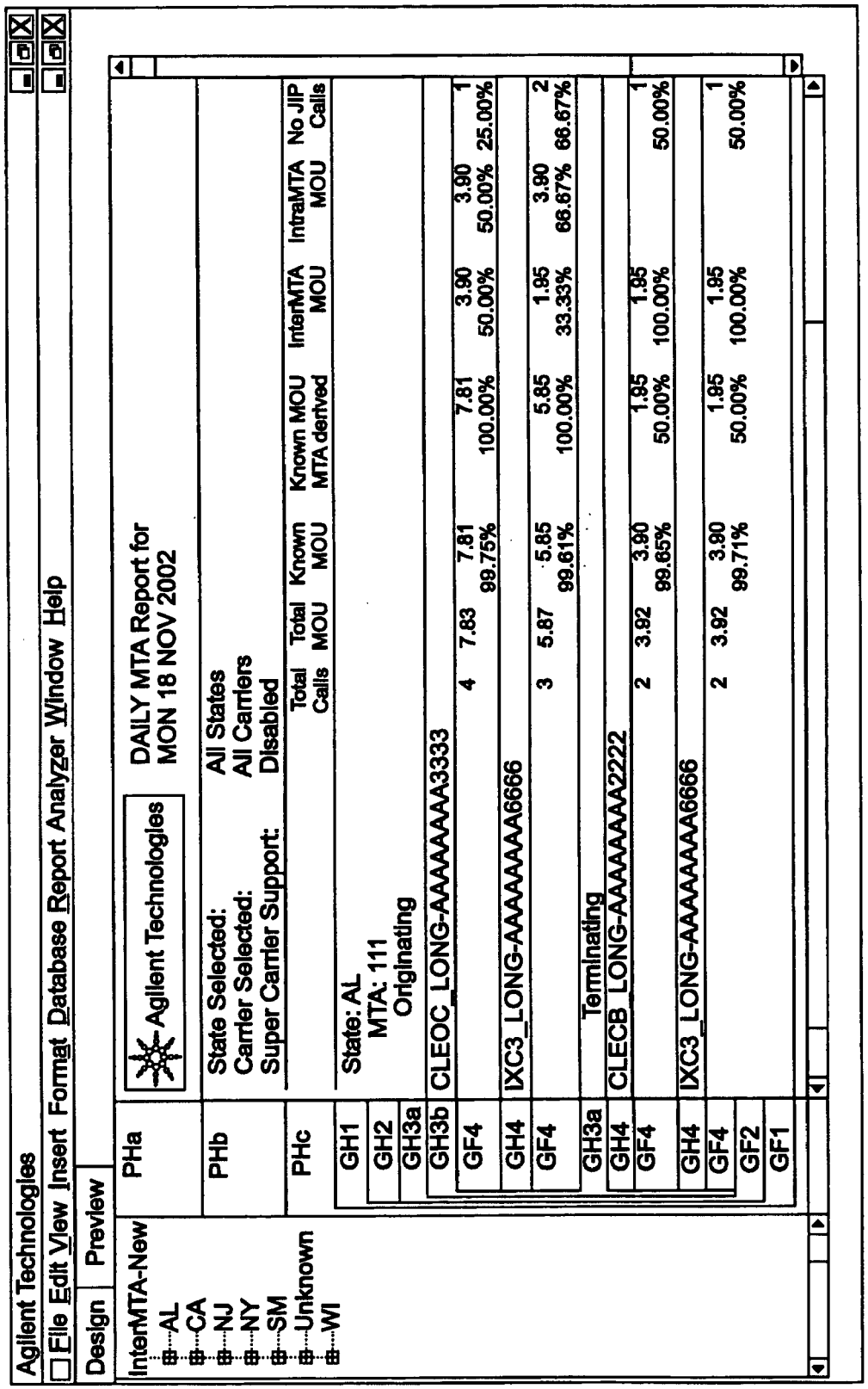
FIG. 8 is a screen shot of a report produced using a method in accordance with a preferred embodiment of the present invention.

In step 710, a report based on the calculated statistics is generated and output. FIG. 8 is a screen shot of an example of one possible format that can be used. The example shown in FIG. 8 was produced using the commercially available CRYSTAL REPORTS, but other packages and formats could be used. The procedure ends in step 712.

Although a few variations of the preferred embodiment of the present invention have been shown and described, it would be appreciated by those skilled in the art that changes may be made to the described invention without departing from the principles and spirit of the invention, the scope of which is defined in the claims and their equivalents. For example, while the discussion herein has focused on the use, enrichment and analysis of CDRs, those of ordinary skill in the art recognize that other data structures may be substituted, such as Correlated Call Records (CCRs), which are the combining of two or more CDRs representing the same call. Also, the terms applied to the various data structures and procedures are for the purposes of clarity and do not represent any particular data structure or procedure. In particular, the present discussion was presented in the context of AGILENT's ACCESS7 and adopts the nomenclature thereof. However, the present invention is applicable to other systems, which may use different nomenclature to describe similar structures and to which the present invention may be equally applied.

The described procedures may also be modified to account for process flows other than the described process flow used by the AGILENT ACCESS7 OSS. For example, the described process flow enriches the CDRs stored in the CDR storage 204. However, it is possible to just enrich the summary records without enriching the CDRs.

What is claimed is:

1. A system for enriching call detail records, the system comprising:
 a database cross referencing NPA/NXX with MTA; and
 a procedure that:
   retrieves call detail records;
   enhances the retrieved call detail records by adding information indicative of whether an originating MTA is different from a terminating MTA, the information being derived from an originating NPA/NXX and terminating NPA/NXX in the call detail records along with the database; and
   stores the enhanced call detail records.

2. A system for enriching call detail records, as set forth in claim 1, wherein the procedure retrieves call detail records by selecting call detail records describing calls that originate from a wireless phone.

3. A system for enriching call detail records, as set forth in claim 1, wherein the procedure enhances the retrieved call detail records by adding fields indicating an originating MTA and a terminating MTA.

4. A system for enriching call detail records, as set forth in claim 1, wherein the procedure enhances the retrieved call detail records by adding a field indicating whether the call was an inter-MTA call.

5. A system for enriching call detail records, as set forth in claim 1, wherein the procedure enhances the retrieved call detail records by adding a field indicating whether the call was an intra-MTA call.

6. A system for enriching call detail records, as set forth in claim 1, wherein the procedure stores the enhanced call detail records in the same file from which the call detail records were originally retrieved.

7. A system for enriching call detail records, as set forth in claim 2, wherein the originating NPA/NXX is obtained from the JIP.

8. A system A system for enriching call detail records, as set forth in claim 2, wherein the originating NPA/NXX is obtained from the MIN of the wireless phone.

9. A method of determining whether a phone call is inter-MTA or intra-MTA, the method comprising:
 retrieving records that describe the call, the records having fields indicating an originating NPA/NXX and a terminating NPA/NXX;
 determining the originating MTA using the originating NPA/NXX;
 determining the terminating MTA using the terminating NPA/NXX; and
 comparing the determined originating MTA with the determined terminating MTA.

10. A method of enriching call detail records, the method comprising:
 retrieving call detail records;
 accessing a database cross referencing NPA/NXX with MTA;
 enriching the retrieved call detail records by adding information indicative of whether an originating MTA is different from a terminating MTA, the information being derived from an originating NPA/NXX and terminating NPA/NXX in the call detail records along with the database; and
 storing the enriched call detail records.

11. A method, as set forth in claim 10, wherein the step of retrieving call detail records comprises selecting call detail records describing calls that originate from a wireless phone and terminate on a land line phone.

12. A method, as set forth in claim 11, wherein the step of selecting comprises looking up an originating NPA/NXX in the LERG and selecting the call detail records where the originating NPA/NXX is a wireless number.

13. A method, as set forth in claim 11, wherein the step of selecting comprises checking to see if a JIP associated with the call has been populated and selecting the call detail records where JIP is populated.

14. A method, as set forth in claim 10, wherein the step of enriching the retrieved call detail records comprises adding fields indicating an originating MTA and a terminating MTA.

15. A method, as set forth in claim 10, wherein the step of enriching the retrieved call detail records comprises adding a field indicating whether the call was an inter-MTA call.

16. A method, as set forth in claim 10, wherein the step of enriching the retrieved call detail records comprises adding a field indicating whether the call was an intra-MTA call.

17. A method, as set forth in claim 10, wherein the step of storing the enhanced call detail records comprises storing the enhanced call detail records in the same file from which the call detail records were originally retrieved.

18. A method, as set forth in claim 10, further comprising:
identifying an originating NPA/NXX using a JIP associated with the call.

19. A method, as set forth in claim 10, further comprising:
identifying an originating NPA/NXX using a MIN of a wireless phone that originated the call.

20. An SS7 operations support system comprising:
a call detail record builder that analyzes SS7 messages and builds call detail records that describes phone calls;
a CDR storage that stores the call detail records built by the call detail record builder;
a database that cross references NPA/NXX with MTA
a CDR enricher that
retrieves call detail records from the CDR storage describing calls that originate from a wireless phone and terminate on a land line phone;
enhances the retrieved call detail records by adding information indicative of whether an originating MTA is different from a terminating MTA, the information being derived from an originating NPA/NXX and terminating NPA/NXX in the call detail records along with the database; and
stores the enhanced call detail records.

21. An SS7 operations support system, as set forth in claim 20, further comprising:
an analyzer that retrieves the call detail records enhanced by the CDR enricher and prepares a report indicating a percentage of inter and intra MTA calls for each wireless service provider from which a call originated.

22. An SS7 operations support system, as set forth in claim 21, wherein the analyzer prepares a summary record using retrieved call detail record, the summary record containing a sub-set of the data available in the original call detail record.

23. A method of analyzing SS7 records, the method comprising:
building a call detail record using SS7 messages, the call detail record containing an indication of an originating NPA/NXX and a terminating NPA/NXX;
storing the call detail record;
retrieving call detail records describing calls originating from a wireless phone and terminating on a land line phone;
enriching the retrieved call detail records to provide an indication of whether an originating MTA is different from a terminating MTA using information from a database that cross references NPA/NXXs with MTAs; and
analyzing the enhanced call detail records to determine a percentage intra and inter MTA call by service provider.

24. A method of analyzing SS7 records, the method comprising:
building a call detail record using SS7 messages, the call detail record containing an indication of an originating NPA/NXX and a terminating NPA/NXX;
storing the call detail record;
retrieving call detail records describing calls originating from a wireless phone and terminating on a land line phone;
creating a summary of each of the call detail records, the summary containing an indication of whether an originating MTA is different from a terminating MTA using information from a database that cross references NPA/NXXs with MTAs; and
analyzing the summaries to determine a percentage intra and inter MTA call by service provider.

25. A method of determining whether a phone call is inter-MTA or intra-MTA, the method comprising:
monitoring SS7 messages to determine an originating NPA/NXX and a terminating NPA/NXX of the phone call;
determining the originating MTA based on the originating NPA/NXX;
determining the terminating MTA based on the terminating NPA/NXX; and
comparing the determined originating MTA with the determined terminating MTA.

26. A method of determining whether a phone call is inter-MTA or intra-MTA, the method comprising:
retrieving records that describe the call, the records having information regarding the origination location and termination location of the call;
determining the originating MTA using the origination information;
determining the terminating MTA using the terminating information; and
comparing the determined originating MTA with the determined terminating MTA.

* * * * *